United States Patent [19]

Hamada et al.

[11] Patent Number: 4,573,375
[45] Date of Patent: Mar. 4, 1986

[54] CONTROL SYSTEM AND METHOD FOR AUTOMATIC TRANSMISSION FOR AUTOMOTIVE VEHICLE

[75] Inventors: Hideo Hamada; Yoshiro Morimoto, both of Yokosuka; Masaaki Suga; Takashi Murasugi, both of Yokohama; Tadashi Suzuki, Yokosuka, all of Japan

[73] Assignee: Nissan Motor Company, Limited, Japan

[21] Appl. No.: 462,337

[22] Filed: Jan. 31, 1983

[30] Foreign Application Priority Data

Feb. 10, 1982 [JP] Japan ............................ 57-18905

[51] Int. Cl.⁴ ............................................ B60K 41/06
[52] U.S. Cl. ........................................ 74/863; 74/865; 74/866; 74/867; 74/877
[58] Field of Search ................. 74/866, 867, 868, 869, 74/877, 863, 864, 865, 752 A, 752 C, 752 D; 364/424.1

[56] References Cited

U.S. PATENT DOCUMENTS

| 3,561,296 | 2/1971  | Iijima          | 74/864 |
|-----------|---------|-----------------|--------|
| 3,688,609 | 9/1972  | Friedline       | 74/866 |
| 3,785,224 | 1/1974  | Will            | 74/865 |
| 3,871,250 | 3/1975  | Miyauchi et al. | 74/869 |
| 3,903,759 | 9/1975  | Hashimoto       | 74/866 |
| 4,274,306 | 6/1981  | Yokoi et al.    | 74/866 |
| 4,395,926 | 8/1983  | Kubo et al.     | 74/869 |
| 4,406,181 | 9/1983  | Kubo et al.     | 74/868 X |
| 4,417,307 | 11/1983 | Kubo et al.     | 74/866 X |
| 4,462,276 | 7/1984  | Takano          | 74/866 |

FOREIGN PATENT DOCUMENTS

| 1076677 | 4/1980  | Canada ............................ 74/867 |
| 000960  | 7/1979  | European Pat. Off. . |
| 2154673 | 6/1972  | Fed. Rep. of Germany . |
| 3030085 | 3/1981  | Fed. Rep. of Germany . |
| 1137817 | 6/1957  | France . |
| 7109391 | 12/1971 | France . |
| 7207546 | 10/1972 | France . |
| 841706  | 7/1968  | United Kingdom . |
| 1140450 | 1/1969  | United Kingdom . |
| 2080451 | 2/1982  | United Kingdom ................. 74/864 |

Primary Examiner—Leslie A. Braun
Assistant Examiner—Dwight G. Diehl
Attorney, Agent, or Firm—Lane and Aitken

[57] ABSTRACT

In an automatic transmission for an automotive vehicle, an operating area covered by a high gear ratio is extended toward low vehicle speed side and the high gear ratio is released in response to the opening degree of the throttle and vehicle speed. The high gear ratio is released when the vehicle speed value is lower than a predetermined vehicle speed value and the opening degree of the throttle is larger than a predetermined opening degree.

9 Claims, 9 Drawing Figures

CONTROL SYSTEM AND METHOD FOR AUTOMATIC TRANSMISSION FOR AUTOMOTIVE VEHICLE

BACKGROUND OF THE INVENTION

The present invention relates to a control system and method for an automatic transmission for an automotive vehicle, and more particularly to a system and method for controlling a shift between a gear ratio and the next lower adjacent gear ratio, particularly between the highest gear ratio and the next lower adjacent gear ratio, such as an overdrive and a third gear ratio in the case of a four speed transmission.

In the automotive automatic transmissions, a shift is made automatically by actuating one of a plurality of shift valves in response to a throttle fluid pressure variable with an intake manifold vacuum of an engine and a governor fluid pressure variable with a vehicle speed. In the case of a four speed automatic transmission having a highest gear ratio in the form of an overdrive, the same control method holds and a similar shift valve is used to make a shift between the overdrive and a third gear ratio in response to the throttle fluid pressure and the governor fluid pressure and in accordance with a predetermined shift schedule as shown in FIG. 8 wherein a solid line shows shift points from the third gear ratio up to the overdrive (abbreviated as OD) and a broken line shift points from the overdrive down to the third gear ratio.

Referring to FIG. 7, it is shown how the intake manifold vacuum which affects the throttle fluid pressure varies with the variation of the vehicle speed for different throttle opening degree values. It will be noted that when the throttle opening degree is larger than 50%, substantially the same intake manifold vacuum develops at any vehicle speed value as that developed when the throttle opening degree is 100%. This trend is attributable to various exhaust gas purification measures. When the throttle opening degree is between 50% and 100%, a shift between the third gear ratio and the overdrive is made at substantially the same vehicle speed value. This is not desirable as will be understood from the observation of FIG. 8. In FIG. 8, if intake manifold vacuum versus vehicle speed variation curve α for throttle opening degree of 50% is drawn, it will be understood that the overdrive is established within an operating area A defined between the two shift schedule lines and above the curve α, whereas the third gear ratio is established within an operating area B defined between the downshift schedule line (broken line) and below the curve α. This results in an insufficient acceleration within the operating area A. Besides, the employment of the overdrive does not make as much contribution to the improvement of fuel economy as expected because the overdrive is not used within the operating area B. Desirably, the overdrive should be established within the operating area B and released within the operating area A.

SUMMARY OF THE INVENTION

According to the present invention, a control system for an automatic transmission for an automotive vehicle comprises means responsive to a throttle fluid pressure variable with an intake manifold vacuum and a governor fluid pressure variable with a vehicle speed for changing the automatic transmission between the highest gear ratio and the next lower adjacent gear ratio, comprises means for generating a vehicle speed signal variable with the vehicle speed, means for generating a throttle opening signal indicating that the throttle opening degree is larger than a predetermined opening degree value, and means responsive to the vehicle speed signal and said throttle opening signal for forcing the automatic transmission to downshift from the highest gear ratio to the next lower adjacent gear ratio.

According to the present invention, a control system for an automatic transmission for an automotive vehicle comprises means responsive to an intake manifold vacuum and a vehicle speed of the automotive vehicle for changing the automatic to a high gear ratio from the next lower adjacent gear ratio in accordance with a predetermined schedule to provide fuel-efficient engine operation, and means responsive to the vehicle speed of the automotive vehicle and the opening degree of the throttle for forcing the automatic transmission to downshift from the high gear ratio to the next lower adjacent gear ratio when the vehicle speed is lower than a predetermined vehicle speed at which the engine produces a predetermined amount of torque in said highest gear ratio, said predetermined amount of torque being selected so as to provide normal acceleration, and the opening degree of the throttle is larger than a predetermined opening degree value to provide normal acceleration when the throttle opening is larger than said predetermined opening value.

According to the present invention, a control method for an automatic transmission for an automotive vehicle, comprises a step of changing the automatic transmission between the highest gear ratio and the next lower adjacent gear ratio in response to a throttle fluid pressure variable with an intake manifold vacuum and a governor fluid pressure variable with a vehicle speed of the automotive vehicle, and a step of forcing the automatic transmission to downshift from the highest gear ratio to the next lower adjacent gear ratio in response to a vehicle speed signal variable with the vehicle speed and a throttle opening signal indicating that the throttle opening degree is larger than a predetermined opening degree value to provide normal acceleration when the throttle opening is larger than said predetermined opening value.

According to the present invention, a control method comprises a step of changing the automatic transmission to a high gear ratio from the next lower adjacent gear ratio in response to the intake manifold vacuum and a vehicle speed of the automotive vehicle, and a step of forcing the automatic transmission to downshift from the high gear ratio to the next lower adjacent gear ratio when the vehicle speed is lower than the aforesaid predetermined vehicle speed value and the opening degree of the throttle is larger than the aforesaid predetermined opening degree value.

Accordingly an object of the present invention is to improve an automatic transmission for an automotive vehicle in such a manner as to permit extension of the operating area covered by a high gear ratio, which is suitable for enhancement of fuel economy towards low vehicle speed side by releasing the high gear ratio within an operating area where acceleration is desired in response to the opening degree of throttle and vehicle speed.

DESCRIPTION OF THE EMBODIMENT

Figure 1:
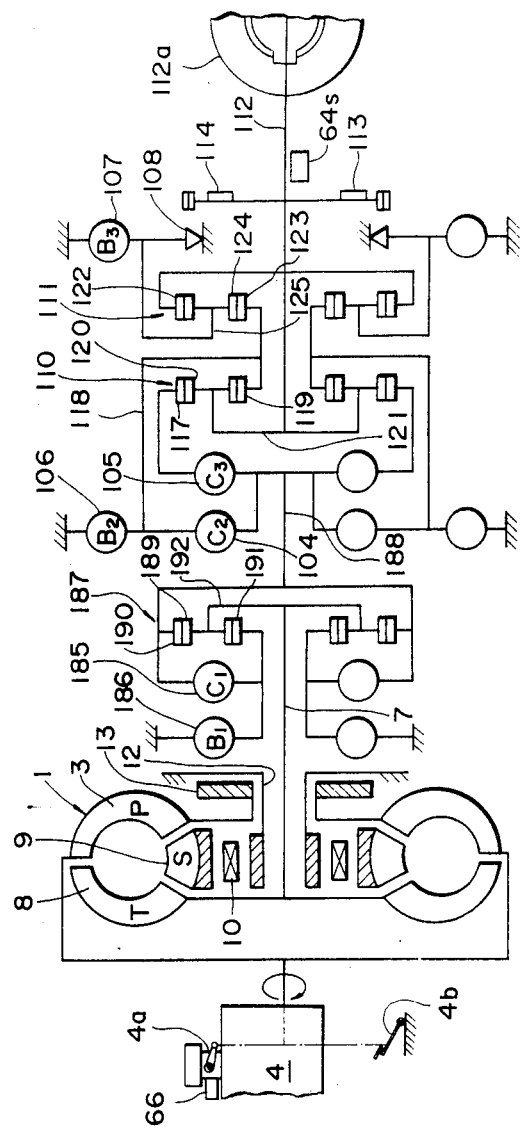
FIG. 1 is a diagrammatic view of a power train for an automatic transmission for an automotive vehicle.

Referring to FIG. 1 a gear train of an automatic transmission is described. The gear train comprises a torque converter 1, an overdrive planetary gear set 187, an input planetary gear set 110 and an output planetary gear set 111.

The torque converter 1 comprises a pump 3, a turbine 8 and a stator 9. The stator 9 is disposed around a sleeve 12 with a one-way clutch 10 therebetween. The pump 3 is connected to an engine 4 to be driven thereby and connected also to an oil pump 12 to drive same. The opening degrees of the throttle is controlled by an accelerator 4b. The engine has an induction pipe 4a wherein a throttle is mounted which opens in degrees. Mounted to the induction pipe 10 is a throttle switch 66 which is described later.

The overdrive planetary gear set 187 includes a ring gear 190, a sun gear 191 and a planet carrier 192 carrying a plurality of planet gears 189, each meshing with the ring gear 190 and sun gear 191. The carrier 192 is connected to an input shaft 7 which is in turn connected to the turbine 8 of the torque converter 1. The ring gear 190 of the overdrive planetary gear set 187 is connected to an intermediate shaft 188. A direct clutch 185 has one side connected to the ring gear 190 and the other side connected to the sun gear 191. When the direct clutch 185 is engaged, it locks the overdrive planetary gear set 187. An overdrive (OD) band brake 186 is connected to the sun gear 191 and adapted to anchor same. The ring gear 190 is connected to an intermediate shaft 188 which is connected to the ring gear 117 of the planetary gear set 110 through a rear clutch 105 and also with the sun gears 119 and 123 through a front clutch 104 and via a drum 118. A planet carrier 121 of the input planetary gear set 110 is connected to a ring gear 122 of the output planetary gear set 111 and to an output shaft 112 which is connected to a road wheel 112a of an automotive vehicle. A planet carrier 125 of the planetary gear set 111 is connected to a one-way brake 108. The one-way brake 108 allows forward rotation of the carrier 125 but prevents the reverse rotation thereof. A second brake 106 is provided and adapted to anchor the sun gears 119 and 123. A low and reverse brake 107 is provided and adapted to anchor the carrier 125 of the planetary gear set 111. Coupled with the output shaft 112 is a governor valve assembly including a first governor valve 113 and a second governor valve 114. A vehicle speed sensor 64s, which will be later referred to again, is operatively disposed near the output shaft 112.

The various operating positions of the gear train are as follows:

In idling, all brakes and clutches except the direct clutch 185 are disengaged and released. In the first gear ratio, the direct clutch 185 and the rear clutch 105 are engaged, with the second brake 106, the front clutch 104 and the OD band brake 186 released. The power transmitted to the input shaft 7 from the engine 4 by the torque converter 1 is transmitted to the carrier 192. As the overdrive planetary gear set 187 is interlocked by the engagement of the direct clutch 185, it transmits the same rotation as that of the carrier 192 to the intermediate shaft 188 and then to the ring gear 117 of the planetary gear set 110 through the rear clutch 105. Because the reverse rotation of the sun gears 119 and 123 are prevented by the one-way brake 108, the sun gears 119 and 123 serve as reaction members. As a result, the ring gear 122 of the planetary gear set 111 and the output shaft 112 connected thereto are urged to rotate forwardly.

In order to effect an upshift to the second gear ratio, the direct clutch 185 and rear clutch 105 remain engaged, and the second brake 106 is applied to anchor the sun gears 119 and 123. As a result the sun gear 119 serves as a reaction member. Therefore, the carrier 121 and the output shaft 112 connected thereto are urged to rotate forwardly at a reduced speed which is higher than the speed of rotation of the output shaft 112 for the first gear ratio.

In order to effect an upshift to the fourth gear ratio or overdrive, the direct clutch 185 is engaged, the OD band brake 186 is applied and the rear clutch 105 and the front clutch 104 remain engaged. The sun gear 191 is anchored by the power is transmitted not only to the ring gear 117 but also to the sun gear 119, the planetary gear sets 110 and 111 are interlocked to rotate as a unit. Consequently, the output shaft 112 rotates at the same speed as the input shaft 7 rotates.

In the fourth gear ratio or overdrive, the OD band brake 186 is applied and rear clutch 105 and front clutch 104 are engaged. The sun gear 191 is anchored by the overdrive brake 186 serving as a reaction member. The rotation of the input shaft 7 therefore causes the ring gear 185 to rotate at an increased speed. This increased rotational speed is transmitted to the output shaft 112 because the planetay gear sets 110 and 111 are interlocked.

In the reverse gear, the direct clutch 185 and front clutch 104 are engaged and low and reverse brake 107 is applied. As the overdrive gear set 187 is interlocked, the power from the engine 4 transmitted to the input shaft 7 by the torque converter 1 is transmitted to the sun gears 119 and 123 through the front clutch 104. Since the carrier 125 serves as a reaction member, the forward rotation of the sun gear 123 causes the ring gear 122 and output shaft 112 to rotate in the reverse direction at a reduced speed.

Figure 2A:
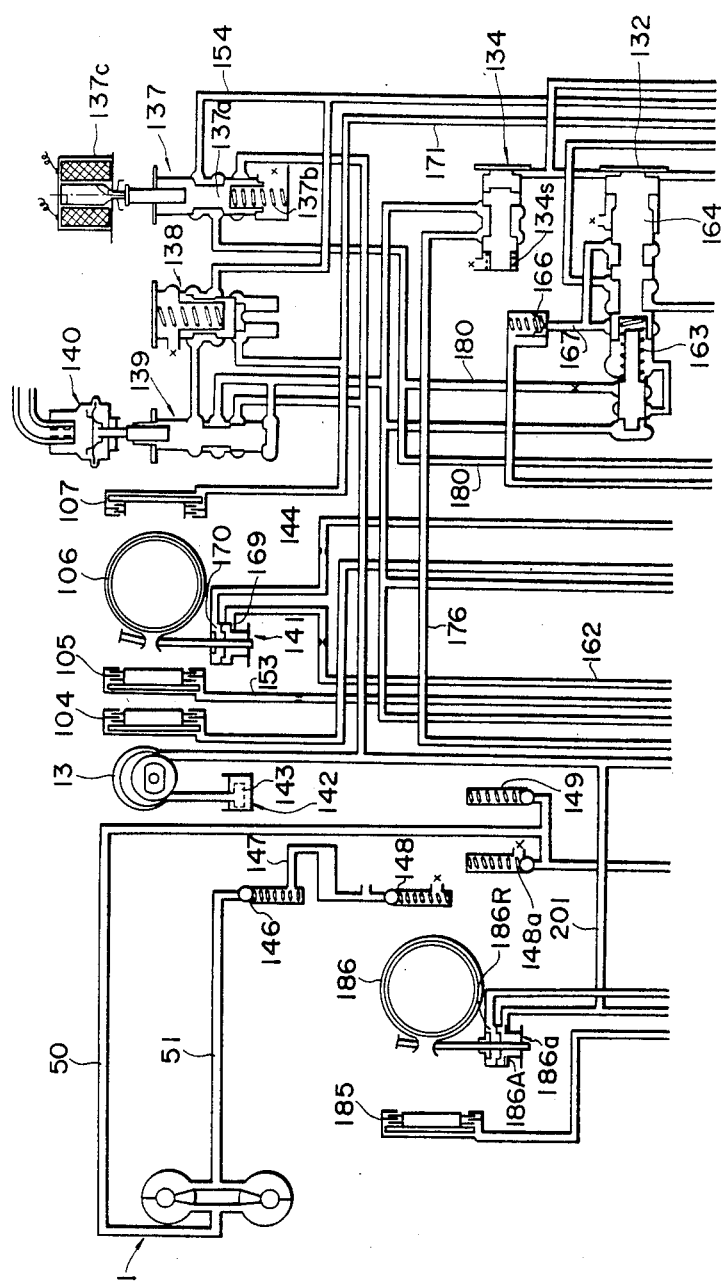
FIGS. 2A and 2B, when combined, are a hydraulic circuit diagram of a control system for the automatic transmission.

Referring to FIGS. 2A nd 2B, they show a hydraulic circuit diagram of a control system for the automatic transmission. The control system comprises a line pressure regulator valve 128, a pressure booster valve 129, a speed selector valve 130, a 1-2 shift valve 131, a 2-3 shift alve 132, a 3-4 shift valve 133, a cut-down valve 134, a second lock valve 135, a 2-3 timing valve 136, a solenoid down shift valve 137, a throttle back-up valve 138, a vacuum throttle valve 139, a vacuum diaphragm 140, a second brake band servo 141, an OD band brake servo 186a, an accumulator 200, and an OD control valve 197. The oil pump 13 is driven by the engine 4 through the pump 3 of the torque converter 1 for drawing oil from a reservoir 142 through a strainer 143 during all operating conditions of the engine 4 and supplies oil to the line pressure regulator valve 128.

The oil is regulated by the line pressure regulator valve 128 and the thus regulated pressurized oil, which is called as a line fluid pressure, is supplied to the selector valve 130 through a line pressure circuit 144.

The line pressure regulator valve 128 comprises a spool 172 and a spring 173. The spring 173 acts on the spool 172 to bias same. In addition to the bias by the spring 173, a throttle fluid pressure variable with engine intake manifold vacuum developing in a throttle pressure circuit 165 and the line pressure developing in the line pressure circuit 144 act on a spool 174 of the pressure booster valve 129 and in turn to the spool 172 of the line pressure regulator valve 128 against the bias resulting from the line pressure acting on the upper areas of the spool 172.

Pressurized oil is supplied to the torque converter 1 by the line pressure regulator valve 128 via a circuit 145 and a supply passage 50. After flowing through the converter 1, the oil is discharged through a discharge passage 51. The oil pressure within the torque converter 1 is regulated by a regulating valve 146 which when opens discharges oil to a circuit 147 which supplies oil to rear part of the transmission for lubrication. When the pressure within the circuit 147 becomes higher than a certain level, a drain valve 148 opens. The front part of the transmission is lubricated by oil supplied from the circuit 145 via a front lubrication valve 149. The oil pressure for front lubrication is maintained below a certain level by a drain valve 148a.

Figure 2B:
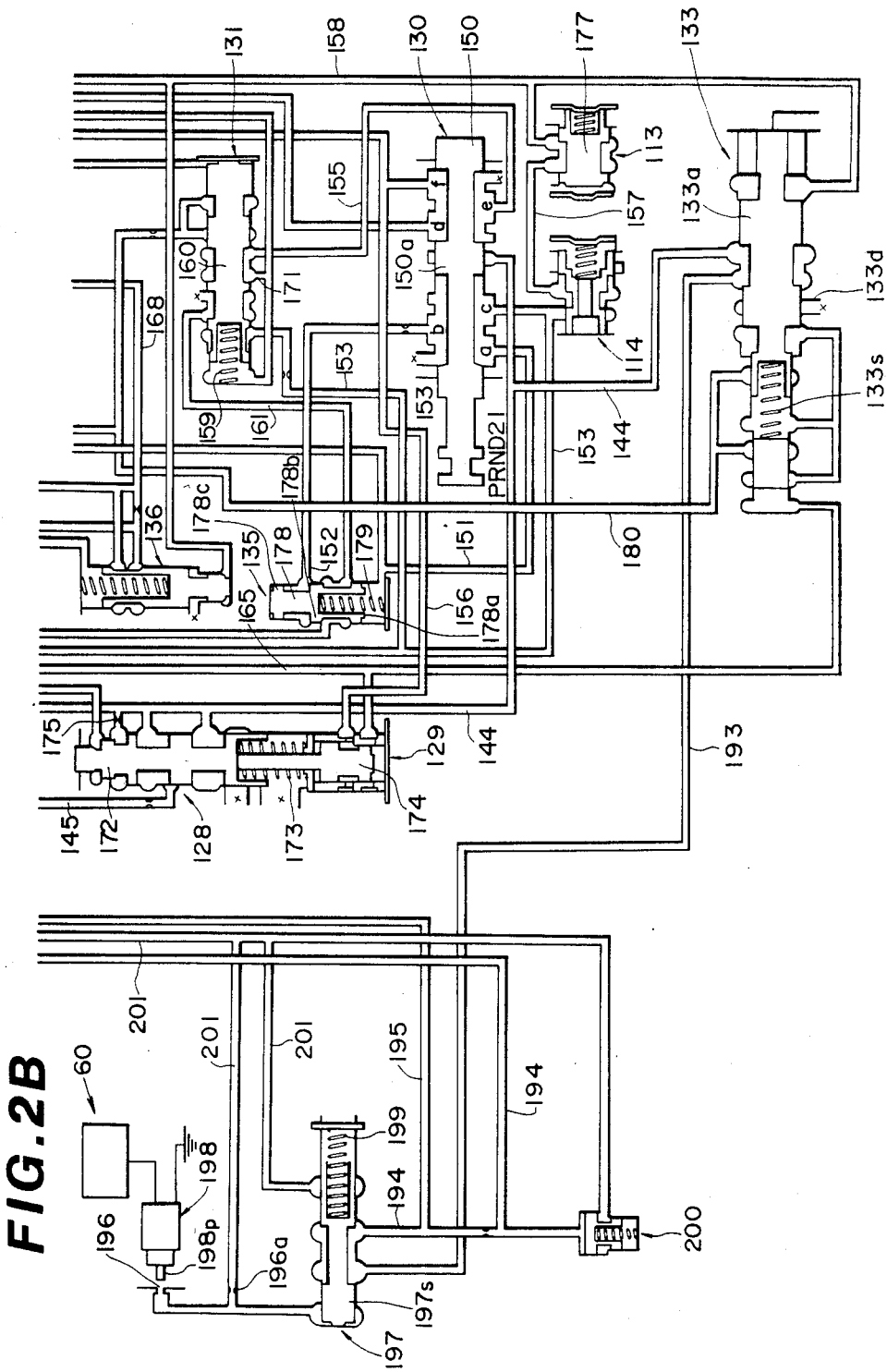

The selector valve 130 comprises a spool 150, and is connected to a manual selector lever (not shown) through a mechanical linkage (not shown). FIG. 2B shows a condition wherein the selector valve 130 is in "N" (neutral) position. As illustrated, the line pressure circuit 144 is closed by a land 150a of the spool 150 and all ports a, b, c, d, and e communicate with drain ports indicated by "x".

The first and second governor valves 113 and 114 are in operation to produce a governor fluid pressure during a forward during condition. When the selector valve 130 assumes either "D", "2" or "1" position, pressurized oil is fed from the line pressure circuit 144 to the second governor valve 114 through the port c. If, under this condition, the automotive vehicle starts to move, the pressurized oil regulated by the second governor valve 114 is supplied to a circuit 157 leading to the first governor valve 113, and when the vehicle speed reaches a predetermined value, the spool 177 of the first governor valve 113 moves to a position wherein the circuit 157 is allowed to communicate with a governor pressure circuit 158, supplying the latter with the governor pressure. The governor pressure in the circuit 158 acts on the respective end surfaces of the 1-2 shift valve 131, 2-3 shift valve 132, 3-4 shift valve 133 and cut-down valve 134 against the respective springs 159, 163, 133s and 134s. The 1-2 shift valve 131 is disposed between a circuit 153 and a circuit 161. Disposed between the circuit 161 and a circuit 162 is the second lock valve 35 to which a circuit 152 leads from the port b of the selector valve 130.

If the selector lever is set to the "D" position, the spool 150 of the speed selector valve 130 assumes a position providing communication between the line pressure circuit 144 and ports a, b and c. From the port a, pressurized oil is supplied through the circuit 151 to the second lock valve 135 to act on the lower end thereof for preventing the interruption between the circuits 161 and 162. A portion of the oil from the port a is supplied through an orifice 166 and a circuit 167 to the 2-3 shift valve 132. The pressurized oil from the port c is supplied through a circuit 153 to the second governor valve 114, rear clutch 105, and 1-2 shift valve 131. The pressurized oil within the line pressure circuit 144 is supplied also to the OD control valve 197 through the 3-4 shift valve 133 and an oil conduit 193 and thereafter to the direct clutch 185 through an oil conduit 194. Therefore, when the selector valve 130 is set to "D" position, the direct and rear clutches 185 and 105 are engaged, thereby establishing the first gear ratio.

When, under this condition, the vehicle speed increases up to a certain value, the governor pressure in the circuit 158 becomes high enough to move to the spool 160 of the 1-2 shift valve 131 leftwardly against the spring 159, thereby making an upshift from the first gear ratio to the second gear ratio. This movement of the spool 160 permits the circuit 153 to communicate with the circuit 161, allowing the oil to be supplied to the apply side chamber 169 of the servo 141 through the second lock valve 135 and a circuit 162, applying the second brake 106. As a result, the second gear ratio is established.

When the vehicle speed further increases up to another higher value, the governor pressure in the circuit 158 becomes high enough to move the spool 164 of the 2-3 shift valve 132 to the left overcoming the spring 163, allowing the circuit 167 to communicate with the circuit 168, thereby supplying the oil through the circuit 168 to the release side chamber 170 of the servo 141 so as to release the second brake 106 and also to the front clutch 104 to engage same. This results in the establishment of the third gear ratio.

When the vehicle speed increases further to still another higher value, the governor pressure in the circuit 158 becomes high enough to move a spool 133a of the 3-4 shift valve 133 leftwardly against the spring 133s to a position wherein the oil conduit 193 is prevented from communicating with the line pressure circuit 144 but allowed to communicate with a drain port 133d. This causes the pressurized oil having been supplied to the direct clutch 185 and release side chamber 186R of the OD band brake servo 186a to be drained via the port 133d. Thus, the direct clutch 185 is released and the OD band brake 186 is applied. The OD band brake 186 is applied by the pressurized oil supplied to the apply side chamber 186A. In this manner, the fourth gear ratio (overdrive) is established.

If the driver depresses the acclerator 4b down to a position causing the full opening of the throttle during operation with the selector lever in the "D" position, a kickdown switch is closed, supplying current to a downshift solenoid 137c to energize same. The energization of the downshift solenoid 137c causes the spool 190 of the solenoid downshift valve 137 to move downwardly against a spring 191 from the position illustrated in FIG. 2 to a position wherein the kickdown circuit 180 is allowed to communicate with the line pressure circuit 144, supplying the pressurized oil in line pressure circuit 144 through the circuits 144 and 180 to the 1-2 shift valve 131, 2-3 shift valve 132, and 3-4 shift valve 133, acting on them in the opposed relationship with the governor pressure. If the kickdown takes place when the transmission is in the overdrive, the spool 133a of the 3-4 shift valve 133 is forced to move rightwardly against the governor pressure to the illustrated position, supplying the pressurized oil in the line pressure circuit 144 to the direct clutch 185 and to the release side chamber 186R of the OD band brake servo 186a, engaging the direct clutch 185 and releasing the OD band brake 186, thereby establishing the third gear ratio. If the above-mentioned kickdown is carried out when the transmission is in the third gear ratio, the spool 164 of the 2-3 shift valve is forced to move rightwardly to the illustrated position, making a downshift to the second gear ratio after the vehicle speed falls below a predetermined vehicle speed value. If the above-mentioned kickdown is carried out when the transmission is in the second gear ratio, the spool 160 of the 1-2 shift valve 131 is forced to move rightwardly to the illustrated position. This causes a forced downshift to the first gear ratio.

If the selector lever is set to the "2" position, the spool 150 of the selector valve 130 assumes a position wherein the line pressure circuit 144 is allowed to communicate with the ports b, c and d. The pressurized oil from the port b is supplied to the same places as so when the selector lever is set to the "D" position. The pressurized oil from the port c is supplied to the rear clutch 105 to engage same. Under this condition, the pressurized oil does not act on the lower end 178a of the second lock valve 135 because the conduit 151 is drained. Since the lower land 178b having a larger area than the upper land 178b cooperates with the latter to form a chamber therebetween opening to the circuit 152, the pressurized oil in the circuit 152 presses the spool 178 of the second lock valve 135 downwardly against the spring 178 to a position wherein the circuit 152 is permitted to communicate with the circuit 162, allowing the pressurized oil to act on the apply side chamber 169 of the servo 141. The release side chamber 170 of the servo 141 is drained because the pressure supply circuit 167 to the 2-3 shift valve 132 is drained via the port a of the selector valve 130. As explained above, the transmission is locked in the second gear ratio.

If the speed selector lever is moved to the "1" position, the line pressure circuit 144 is allowed to communicate with the ports c, d and e. The oil from the port c is supplied to the rear clutch 105 to effect clutch engagement and the oil from the port d to the same places as so when the lever is in the "2" position, whereas the oil from the port e is supplied through the circuit 155, 1-2 shift valve 131 and circuit 171 to the low-reverse brake 107 so as to act on the low reverse brake 107 which, when applied, acts as a forward reaction brake. The pressurized oil from the port e is supplied to the left end of the 1-2 shift valve 131, through the circuit 171, pressing the spool 160 to the right in cooperation with the spring 159, thereby locking the transmission to the first gear ratio.

Figure 4:
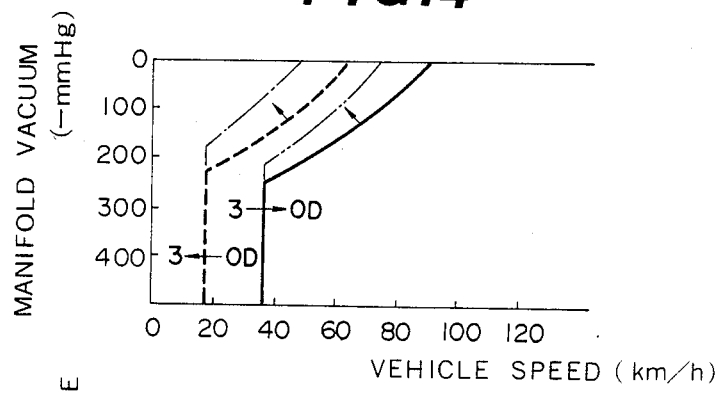
FIG. 4 is a shift schedule diagram used to compare a shift schedule provided by a 3-4 shift valve shown in FIG. 2B with the before mentioned shift schedule shown in FIG. 8.
Figure 8:
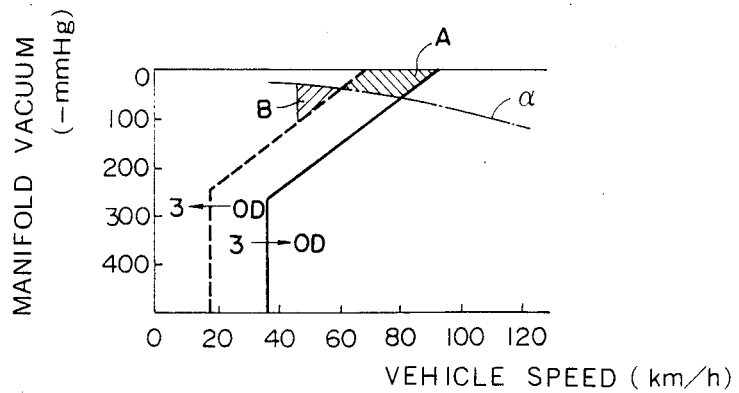
FIG. 8 is a shift schedule diagram before mentioned.

Referring to FIG. 4, the same 3-OD upshift schedule line and OD-3 downshift schedule line as those shown in FIG. 8 are drawn by the solid and broken lines, respectively. FIG. 4 also shows a 3-OD upshift schedule line (two dot chain line) and a OD-3 downshift schedule line (one dot chain line) provided by the 3-4 shift valve 133. It will be understood from comparison of the 3-OD upshift schedule line drawn by the two dot chain line with that drawn by the solid line that with the same intake manifold vacuum value falling in a relatively low vacuum range, an upshift to the overdrive is made at a lower vehicle speed value according to the 3-4 shift valve 133. Comparing the OD-3 downshift line drawn by the one dot chain line with that drawn by the broken line reveals that the downshift from the overdrive takes place at a lower vehicle speed value, also. The OD-3 downshift schedule line provided by the 3-4 shift valve 133 is set to assure that the overdrive is established within the operating area B shown in FIG. 8.

Figure 3:
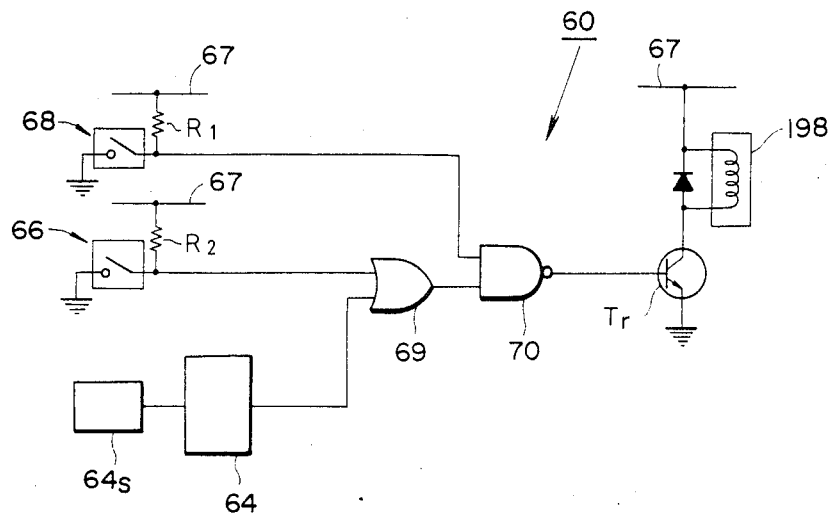
FIG. 3 is a block diagram of an OD control unit shown in FIG. 2B.

For the purpose of making a forced downshift from the overdrive to the third gear ratio, an OD control valve 197 is fluidly disposed between the conduit 193 and conduit 194. The OD control valve 197 normally takes the position illustrated in FIG. 2B wherein the spool 197s allows fluid communication of the conduit 193 with the conduit 194 connected to the direct clutch 185 and connected, via the conduit 195, to the release side chamber 186R of the OD band brake servo 186a. When an OD solenoid valve 198 is energized, a plunger 198p projects to close a drain orifice 196, causing the line pressure to act on the left end of the spool 197s, moving the spool 197s against the spring 199 to a position wherein the spool 197s prevents fluid communication of the conduit 193 with the conduit 194 and establishes a fluid communication between the line pressure conduit 201 and the conduit 194 so that the direct clutch 185 and the release side chamber 186R are disconnected from the 3-4 shift valve 133 and connected to the line pressure conduit 201, supplying at all times the line pressure in the line pressure conduit 201 to act on the direct clutch 185 and the release side chamber 186R of the OD brake band servo 186a, engaging the direct clutch 185 and releasing the OD brake band 186, thereby releasing the overdrive and preventing the automatic transmission from shifting into the overdrive. When thereafter the solenoid valve 198 is deenergized, the pilot pressure acting on the left end of the spool 197s disappears, thereby allowing the transmission to shift as scheduled. The electric current is supplied to the OD solenoid valve 198 when a transistor Tr of an OD control unit 60 (see FIG. 3) is conductive.

Referring to the OD control unit 60, it comprises a manually operable OD switch 68 having one terminal connected to a source of electricity 67 via a resistor R1. The OD switch 68 is connected to one input of a NAND gate 70. When the OD switch 68 is open, the output signal thereof applied to one of two input terminals of the NAND gate 70 is high (H), but upon closing the OD switch 68 when the driver desire to release the overdrive, the output signal goes low (L). Therefore, as long as an input signal on the other input terminal of the NAND gate 70 is high, the output of the NAND gate 70 goes high from low upon closing the OD switch 68, rendering the transistor Tr conductive, allowing supply of current through the solenoid 198.

Figure 5:
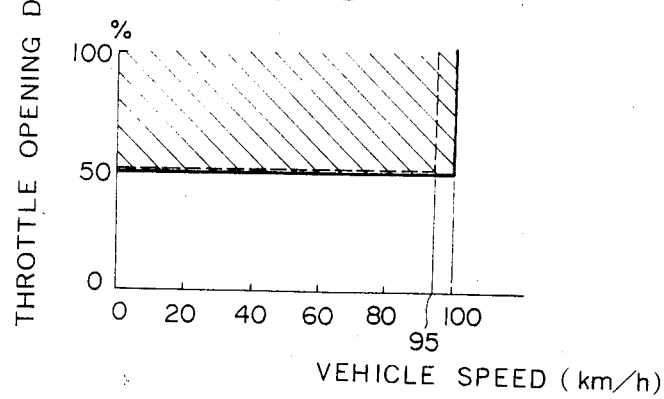
FIG. 5 is a mode diagram used to explain the operation of a throttle switch and a vehicle speed setting circuit shown in FIG. 3.

The OD control unit 60 further comprises a vehicle speed sensor 64s (see FIG. 1 also) which generates a vehicle speed signal variable with the vehicle speed of the automotive vehicle, and a throttle switch 66. The throttle switch 66 is operatively connected with the throttle mounted within the induction pipe 4a and has one terminal connected to the source of electricity 67 through a resistor R2. The setting is such that the throttle switch 66 is open as long as the throttle opens in degrees smaller than 50%, providing a high output signal to one input terminal of an OR gate 69 whose output terminal is connected to the other input terminal of the NAND gate 70. When the throttle opening degree is larger than 50%, the throttle switch 66 is closed, providing a low output signal. The vehicle speed signal is supplied to a vehicle speed setting circuit 64. Referring to FIG. 5, the setting circuit 64 generates a low output signal as long as the vehicle speed is lower than a predetermined vehicle speed value such as 100 Km/h. When the vehicle speed increases beyond 100 Km/h as a result of acceleration of the automotive vehicle, the output signal goes high (H). Subsequently on deceleration of the automotive vehicle, the output signal of the setting circuit 64 remains high as long as the vehicle speed remains higher than another lower vehicle speed value of 95 Km/h and the output signal goes low when the vehicle speed drops past 95 Km/h. The output signal of the setting circuit 64 is supplied to the other input terminal of the OR gate 69.

Assuming now that the OD switch 68 is open, keeping its output signal high, it will be understood that the output signal of the NAND gate 70 remains low as long as the output signal of the vehicle setting circuit 64 is high. Roughly speaking the output signal of the OR gate 69 is low as long as the vehicle operating condition falls outside of the shadowed region in FIG. 5. The output signal of the OR gate 69 is low when the operating condition falls within the shadowed region in FIG. 5. Speaking more specifically, the output signal of the OR gate 69 goes low when the vehicle speed drops past 95 Km/h during deceleration of the vehicle and remains low thereafter until the vehicle speed increases beyond 100 Km/h once the vehicle speed has dropped below 95 km/h. Therefore, assuming that the transmission is in overdrive, the transmission is forced to downshift from the overdrive to the third gear ratio when the output signal of the OR gate 69 goes low, causing the output signal of the NAND gate 70 to go high, thereby rendering the transistor Tr conductive to supply current to the solenoid valve 198.

Figure 6:
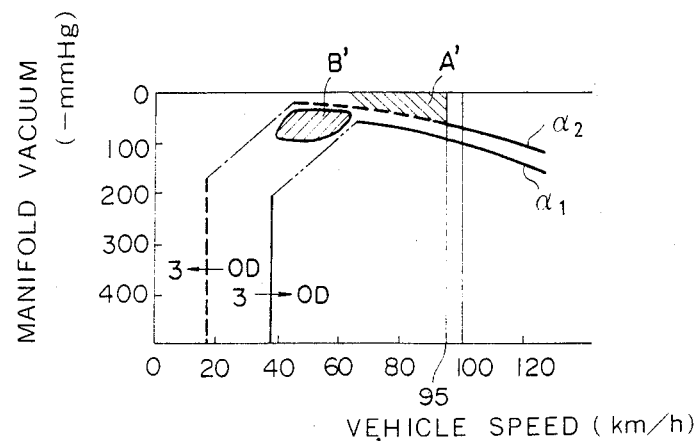
FIG. 6 is a shift schedule diagram provided by the control system shown in FIGS. 2A and 2B.
Figure 7:
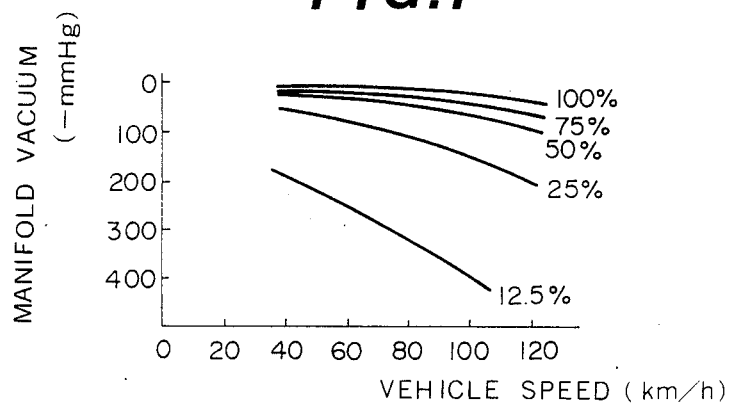
FIG. 7 is a graph showing how the intake manifold vacuum varies with the variation in vehicle speed for different throttle opening degrees.

The actual shift schedule between the third gear ratio and overdrive provided by the embodiment according to the present invention is illustrated in FIG. 6. Referring to FIG. 6, a solid line curve α1 shows the variation in intake manifold vacuum against vehicle speed for the throttle opening degree of 50% when the transmission is in the third gear ratio, whereas, a curve α2 shows the variation in intake manifold vacuum against the vehicle speed for the throttle opening degree of 50% when the transmission is in the overdrive. In this manner, different intake manifold values develop for the third gear ratio and the overdrive, respectively, even with the same throttle opening degree of 50%. Commonly, a shift schedule is represented by an intake manifold vacuum value which develops for a gear ratio which is established right before the occurrence of a shift. Therefore, the curve α1 represents a 3-OD upshift schedule line and the curve α2 represents a OD-3 downshift line.

From the shift schedule diagram shown in FIG. 6, it will be appreciated that the overdrive is established within an operating area B' corresponding to the area B in FIG. 8 and the overdrive is released and third gear ratio is established within an operating area denoted by A' corresponding to the area A shown in FIG. 8. Therefore, a sufficient acceleration is provided within the operating area A' and the fuel economy is assured within the operating area B'.

What is claimed is:

1. A control system for an automatic transmission for an automotive vehicle engine having an accelerator that actuates a throttle which opens in degrees and which is mounted within an induction pipe wherein an intake manifold vacuum develops, the transmission including a high gear ratio and a lower gear ratio, the control system comprising:
    means for generating a throttle fluid pressure variable with the intake manifold vacuum;
    means for generating a governor fluid pressure variable with a vehicle speed of the automotive vehicle;
    means responsive to said throttle fluid pressure and said governor fluid pressure for changing the automatic transmission between the high gear ratio and the lower gear ratio;
    means for generating a vehicle speed signal indicating that the vehicle speed of the automotive vehicle is lower than a predetermined vehicle speed value;
    means for generating a throttle opening signal indicating that the throttle opening degree is larger than a predetermined opening degree value; and
    means responsive to said vehicle speed signal and said throttle opening signal for forcing the automatic transmission to downshift from the high gear ratio to the lower gear ratio.

2. A control system as claimed in claim 1, further comprising:
    means responsive to the accelerator for generating a kickdown fluid pressure; and
    means for forcing the automatic transmission to downshift in response to said kickdown fluid pressure.

3. A control system as claimed in claim 1, wherein the automatic transmission includes
    a pair of planetary gear sets and an overdrive planetary gear set which are operatively coupled together and which provide the highest gear ratio and the lower gear ratio,
    a rear clutch cooperating with said pair of planetary gear sets to provide a forward drive condition of the transmission in all forward gear ratios which include the highest gear ratio and the lower gear ratio,
    a direct clutch which cooperates with said overdrive planetary gear set to lock said overdrive planetary gear set when engaged,
    an overdrive brake which cooperates with said overdrive planetary gear set to establish, when applied in combination with engagement of the rear clutch and release of the direct clutch, the highest gear ratio and to establish, when released in combination with engagement of the rear clutch and engagement of the direct clutch, the lower gear ratio,
    wherein said changing means includes;
    an oil pump;
    a line pressure regulator valve communicating with said oil pump for generating a line fluid pressure;
    a speed selector valve communicating with said line pressure regulator valve, said selector valve being connected with the rear clutch, the direct clutch and the overdrive brake for selectively supplying pressurized fluid thereto; and
    a shift valve communicating with said line pressure regulator valve via said selector valve and connected with the direct clutch and the overdrive brake, said shift valve being connected with said governor fluid pressure generating means and said throttle fluid pressure generating means and being responsive to said governor fluid pressure and said throttle fluid pressure for selectively supplying pressurized fluid to said direct clutch and said overdrive brake;

and wherein said forcing means includes an overdrive control valve communicating with said line pressure regulator valve and connected with said shift valve, the direct clutch and the overdrive brake;

means connected with said vehicle speed generating means for generating an output signal when said vehicle speed signal is lower than a predetermined vehicle speed value, means communicating with said line pressure regulator valve and being responsive to said output signal and throttle opening signal for generating a pilot fluid pressure;

said overdrive control valve being connected with said pilot pressure generating means and responsive to said pilot fluid pressure for establishing direct communication of said line pressure regulator valve with the direct clutch and the overdrive brake to actuate the direct clutch and release the overdrive brake, thereby releasing the highest gear ratio.

4. A control system for an automatic transmission for an automotive vehicle having an engine with a throttle which opens in degrees and which is mounted within an induction pipe wherein an intake manifold vacuum develops, the transmission including a high gear ratio and the lower gear ratio, the control system comprising:

a first control means responsive to the intake manifold vacuum and a vehicle speed of the automotive vehicle for changing the automatic transmission to the high gear ratio from the lower gear ratio; and a second control means responsive to the vehicle speed of the automotive vehicle and the opening degree of the throttle for forcing the automatic transmission to downshift from the high gear ratio to the lower gear ratio when the vehicle speed is lower than a predetermined vehicle speed value and the opening degree of the throttle is larger than a predetermined opening degree value.

5. The control method for an automatic transmission for an automotive vehicle claimed in claim 6, the control method further comprising:

a step of generating a throttle fluid pressure variable with the intake manifold vacuum;

a step of generating a governor fluid pressure variable with a vehicle speed of the automotive vehicle;

a step of changing the automatic transmission between the highest gear ratio and the lower gear ratio in response to said throttle fluid pressure and said governor fluid pressure;

a step of generating a vehicle speed signal variable with a vehicle speed of the automotive vehicle; and a step of generating a throttle opening signal indicating that the throttle opening degree is larger than a predetermined opening degree value.

6. A control method for an automatic transmission for an automotive vehicle having an engine with a throttle which opens in degrees and which is mounted within an induction pipe wherein an intake manifold vacuum develops, the transmission including a high gear ratio and a lower gear ratio, the control method comprising:

a step of changing the automatic transmission to the high gear ratio from the lower gear ratio in response to the intake manifold vacuum and the vehicle speed; and a step of forcing the automatic transmission to downshift from the high gear ratio to the lower gear ratio when the vehicle speed is lower than a predetermined vehicle speed value and the opening degree of the throttle is larger than a predetermined opening degree value.

7. In an automatic transmission for an automotive vehicle having an engine with a throttle valve mounted in an induction pipe where an intake manifold vacuum develops, the automatic transmission being shiftable between a plurality of forward gear ratios including a highest gear ratio and a lower gear ratio:

a clutch with a servo chamber;

a brake with a servo having a brake apply chamber and a brake release chamber, said brake being released when fluid is supplied to said brake release chamber;

said clutch being engaged and said brake being released when the transmission shifts from the highest gear ratio to the lower gear ratio;

a pump as a source of fluid;

a line pressure regulator valve communicating with said pump for generating a line fluid pressure;

a shift valve communicating with said line pressure regulator valve;

an overdrive control valve including a first inlet port communicating with said line pressure regulator valve to receive said line fluid pressure therefrom, a second inlet port communicating with said shift valve to receive fluid pressure therefrom, and an outlet port communicating with said servo chamber of said clutch and said brake release chamber of said servo of said brake, said overdrive control valve shiftable between a first position wherein said outlet port is allowed to communicate with said second inlet port only thereby to establish a fluid communication between said shift valve, said servo chamber of said clutch and said brake release chamber of said servo of said brake, and a second position wherein said outlet port is allowed to communicate with said first inlet port only thereby to establish a fluid communication between said line pressure regulator valve, said servo chamber of said clutch and said brake release chamber of said servo of said brake;

means for generating a first signal indicative of a vehicle speed of the automotive vehicle;

means for generating a second signal indicative of an opening degree of the throttle valve; and means for supplying a pilot fluid pressure to said overdrive control valve to urge said overdrive control valve to assume said second position thereof in response to said first and second signals.

8. The combination as claimed in claim 7, wherein said supplying means includes a fluid conduit having one end formed with a drain opening and an opposite end communicating with said overdrive control valve and an intermediate portion communicating with said line pressure regulator valve, and a solenoid having a plunger movable to close said drain opening.

9. The combination as claimed in claim 8, wherein said solenoid is operatively connected with said first signal generating means and said second signal generating means and is energized when the opening degree of the throttle valve is greater than a predetermined value and the vehicle speed falls in a predetermined vehicle speed range bounded by two different predetermined vehicle speed values.

* * * * *